(12) United States Patent
Gillet et al.

(10) Patent No.: US 8,889,598 B2
(45) Date of Patent: Nov. 18, 2014

(54) TREATMENT PROCESS FOR INHIBITING TOP OF LINE CORROSION OF PIPES USED IN THE PETROLEUM INDUSTRY

(75) Inventors: Jean-Phillippe Gillet, Pierre-Benite (FR); Frédéric Moser, Pierre-Benite (FR); Tong Eak Pou, Irigny (FR)

(73) Assignee: CECA S.A., Puteaux (FR)

( * ) Notice: Subject to any disclaimer, the term of this patent is extended or adjusted under 35 U.S.C. 154(b) by 0 days.

(21) Appl. No.: 13/152,069

(22) Filed: Jun. 2, 2011

(65) Prior Publication Data

US 2012/0220499 A1 Aug. 30, 2012
US 2014/0303044 A9 Oct. 9, 2014

Related U.S. Application Data

(63) Continuation of application No. 11/663,506, filed as application No. PCT/FR2005/002323 on Sep. 20, 2005, now abandoned.

(30) Foreign Application Priority Data

Sep. 22, 2004 (FR) ...................................... 04 10003
May 27, 2005 (FR) ...................................... 05 05366

(51) Int. Cl.
*C09K 8/82* (2006.01)
*C09K 8/54* (2006.01)
*C23F 11/14* (2006.01)
(52) U.S. Cl.
CPC ................. *C09K 8/54* (2013.01); *C23F 11/149* (2013.01); *C23F 11/141* (2013.01)
USPC ........................................................... 507/90

(58) Field of Classification Search
CPC .......................................................... C09K 8/52
USPC ........................................................... 507/90
See application file for complete search history.

(56) References Cited

U.S. PATENT DOCUMENTS

| | | | | | |
|---|---|---|---|---|---|
| 2,997,507 | A | * | 8/1961 | Monroe et al. | 252/364 |
| 4,062,764 | A | * | 12/1977 | White et al. | 208/348 |
| 4,676,834 | A | | 6/1987 | Treybig et al. | |
| 4,686,058 | A | * | 8/1987 | Schwartz et al. | 252/75 |
| 5,211,840 | A | * | 5/1993 | Lehrer et al. | 208/348 |
| 5,902,515 | A | | 5/1999 | Kanwar et al. | |
| 5,961,885 | A | * | 10/1999 | Eaton et al. | 252/390 |
| 6,395,225 | B1 | * | 5/2002 | Pou et al. | 422/16 |
| 2003/0183808 | A1 | | 10/2003 | Walker | |
| 2007/0001150 | A1 | * | 1/2007 | Hudgens et al. | 252/390 |

OTHER PUBLICATIONS

Top of the Line Corrosion in presence of acetic acid and carbon dioxide, Singer et al. Corrosion 2004, Paper No. 04377, pp. 1-20.*

* cited by examiner

*Primary Examiner* — Alicia Bland
(74) *Attorney, Agent, or Firm* — Millen, White, Zelano & Branigan, P.C.

(57) ABSTRACT

The subject-matter of the present invention is multifunctional corrosion inhibitors for protecting from top of line corrosion and bottom line corrosion for pipes used in particular in the petroleum industry.

The corrosion-inhibiting compositions comprise, as inhibitors, at least one amine with a boiling point of between 105 and 130° C.

7 Claims, 3 Drawing Sheets

TREATMENT PROCESS FOR INHIBITING TOP OF LINE CORROSION OF PIPES USED IN THE PETROLEUM INDUSTRY

This application is a continuation of U.S. patent application Ser. No. 11/663,506, filed Mar. 22, 2007, now abandoned.

The present invention relates to the inhibition of steel pipes against top of line corrosion employed in the production of oil and/or gas.

The present invention provides a treatment process for inhibiting the corrosion due to the condensation of water on the roof inside the pipe; this type of corrosion is known under the name of <<twelve o'clock corrosion>> or top of line corrosion.

In a pipe, in order to limit corrosion due to $CO_2$ and/or due to $H_2S$, it is recommended to employ numerous inhibitors in order to efficiently protect the metal of the pipe against one and/or other of these types of corrosion by continuous injection into the corrosive fluid, which is thus distributed homogeneously along the pipe. However, the situation proves to be more difficult in the case where two, indeed even three, of the following parameters are combined: stratified flow of the corrosive fluid, cooling of the pipeline due to lack of insulation and the presence of organic acid (generally acetic acid) in the liquid phase. This phenomenon of top of line corrosion and the explanation which is given above for it are represented in FIG. 1.

To combat top of line corrosion, Y. M. Gunaltun and A. Belghazi, in <<Control of Top of Line Corrosion by Chemical Treatment>>, NACE Corrosion/2001, Paper No. 01033, recommend batch treatment with a longlasting inhibitor or treatment by injection of methyldiethanolamine (MDEA), so as to neutralize the acidity of the corrosive aqueous medium of the bottom line, but they found that this amine does not neutralize the acidity of the condensate (condensed droplets of water) on the roof. R. L. Martin, in <<Inhibition of Vapor Phase Corrosion in Gas Pipelines>>, NACE Corrosion/97, Paper No. 337, and N. N. Andreev and Yu. I. Kuznetsov, in <<Volatile Inhibitors for $CO_2$ Corrosion>>, NACE Corrosion/98, Paper No. 241, have proposed volatile corrosion inhibitors (VCI) at very high dosage (of the order of a few percent).

Guenter Schmitt, Marcel Sheepers and Gerit Siegmund, in "Inhibition of the Top of Line Corrosion under Stratified Flow", NACE Corrosion/2001, Paper No. 01032, have proposed use of a <<climbing>> inhibitor which will be introduced into the corrosive medium like a conventional inhibitor. Due to its very low surface tension, this type of inhibitor would climb along the wall towards the top inside the pipe (twelve o'clock position), thus inhibiting top of line corrosion.

However, none of these known solutions introduces a suitable and totally effective solution to the problem of top of line corrosion of pipes in the production of oil and gas.

The present invention provides a solution to the problem of top of line corrosion of metal pipes, in particular steel pipes, in which corrosive fluids (i.e., comprising water saturated with $CO_2$ or with $H_2S$, plus an organic acid, generally acetic acid) circulate and/or are present, by the use of specific amines and/or their derivatives which, once introduced into the corrosive medium by injection, preferably continuous injection, on the one hand neutralize the acidity of the corrosive medium in the phase where there is stratified flow and, on the other hand, pass into the vapour phase to neutralize the acidity of the water droplets which are condensed (condensate) on the roof of the pipe.

These specific amines have a boiling point of between 105 and 130° C. and are preferably:

3-methoxypropylamine (MOPA) (boiling point: 118° C.), ethyldiisopropylamine (EDIPA) (boiling point: 127° C.), and/or pyridine (boiling point: 114° C.) and its derivatives (mono-, di- and trialkylpyridines). For simplicity, in all which follows, the term <<amine>> simultaneously covers the amines and the derivatives mentioned above.

These amines can be used alone or as a mixture or as a formulation with other inhibitors intended to inhibit other types of corrosion encountered, such as corrosion due to carbon dioxide or hydrogen sulphide. The amines according to the invention, their mixtures and their formulations are preferably completely soluble in water, so that, after their continuous injection, these products are found in the bottom line aqueous phase and also in the condensed aqueous phase which is the cause of top of line corrosion. Advantageously, these products should not promote either the formation of oil/water emulsion or the formation of foam.

Mention may be made, as <<conventional>> corrosion inhibitors, for example, of imidazolines and/or their derivatives and/or phosphoric esters and/or thioacids.

Mention may be made, among preferred imidazolines, of those which originate from the condensation reaction between a fatty acid (or a mixture of fatty acids) of formula RCOOH, where R is a linear or branched $C_{12}$ to $C_{22}$ alkyl chain, and polyalkylenepolyamine, of which the number of carbons n can vary from 1 to 10 of the alkylene group can vary between 1 and 10, such as, for example, DETA (diethylenetriamine), TETA (triethylenetetramine), TEPA (tetraethylenepentamine) or PEHA (pentaethylenehexamine), corresponding to the formula:

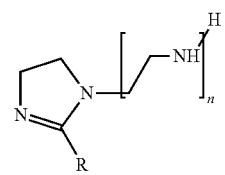

The preferred imidazolines are oxyethylenated imidazolines having from 1 to 20 oxyethylene units.

Mention may be made, among thioacids, for example, of thioglycolic acid or mercaptopropionic acid.

The inhibitory compositions according to the invention can be used pure (100% of corrosion-inhibiting active materials) or diluted in a solvent or else as an emulsion or suspension.

The inhibitory compositions are used, preferably, in continuous treatment, in a proportion of 100 ppm to 10 000 ppm, expressed as weight of the corrosion-inhibiting materials, per one part by volume of corrosive fluids to be treated.

The following examples are intended to give a better understanding of the invention.

EXAMPLE 1

Evaluation of the Neutralizing Power of Various Corrosion Inhibitors

The neutralizing power of the 3 amines according to the invention is tested, as is that of the following amines, by way of comparison:

3-isopropylamine (IPOPA) (boiling point: 103° C.)

3-dimethylaminopropylamine (DMAPA) (boiling point: 133° C.)

methyldiethanolamine (MDEA) (boiling point: 247° C.)

octylamine (OA) (boiling point: 176° C.)

cyclohexylamine (CHA) (boiling point: 134° C.)

Figure 1:
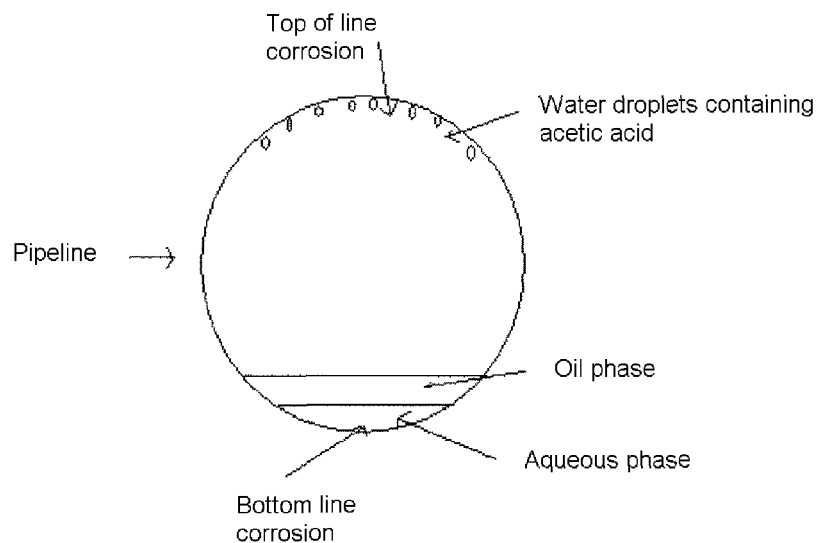
FIG. 1 is a cross-section of a pipeline showing top of line corrosion.
Figure 2:
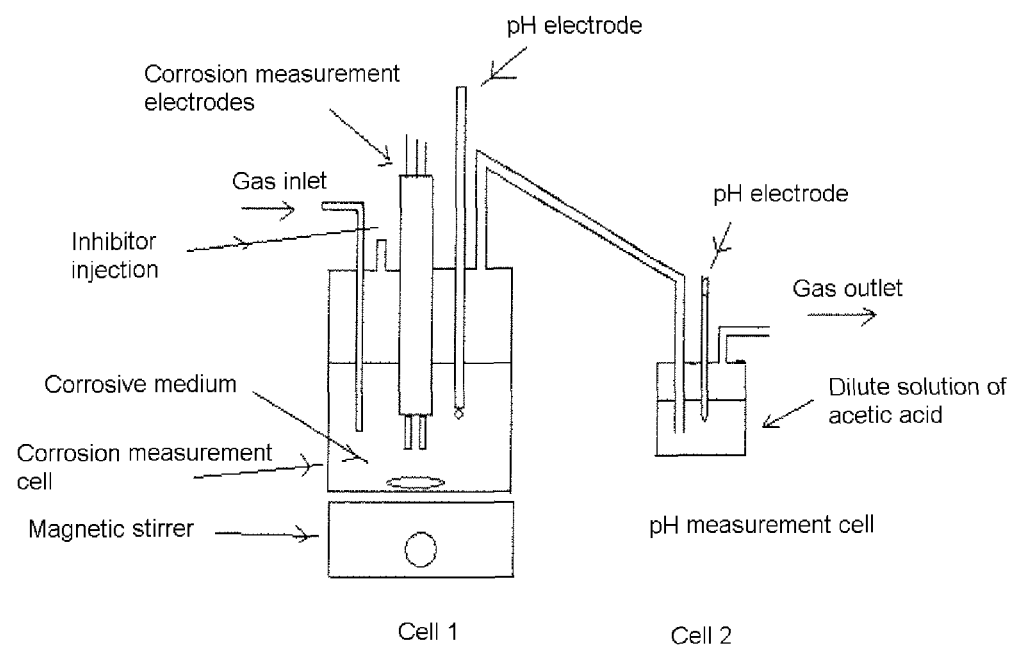
FIG. 2 is an experimental device simulating condensation causing corrosion.

The experimental device simulating the condensation of water for top of line corrosion is represented in FIG. 2. Cell No. 1 (reactor) represents the bottom line, which is a corrosive aqueous medium where the flow is stratified. Cell No. 2 represents the aqueous phase condensed (condensate) at the roof. The corrosion rates for carbon steel are measured by the LPR method. The neutralization is characterized by a pH measurement.

The two glass cells contain a solution comprising 1 g/l of NaCl and 1000 ppm of acetic acid. These solutions are deaerated by sparging with nitrogen and are then saturated with $CO_2$. The working temperature is 85° C. in cell No. 1 and ambient temperature (20-25° C.) for cell No. 2. Screening tests are carried out where the condensation rate is very low but uncontrolled. For this experimental device, it is possible to know if the amine can pass into the vapour phase and can neutralize the acidity of the condensed water. The neutralizing power of the amine is thus studied. The pH values for neutralization of cell No. 1 or reactor (aqueous phase of the bottom line) as a function of the doses of amine added to the reactor are shown in Table 1.

TABLE 1

Change in the pH of the water in the reactor

| Dose (ppm) | IPOPA | DMAPA | MDEA | OA | EDIPA | pyridine | MOPA | CHA |
|---|---|---|---|---|---|---|---|---|
| 0 | 3.26 | 3.24 | 3.44 | 3.38 | 3.31 | 3.43 | 3.45 | 3.40 |
| 50 | 3.40 | 3.56 | 3.62 | 3.49 | 3.42 | 3.64 | 3.64 | 3.60 |
| 200 | 3.54 | 3.72 | 3.76 | 3.61 | 3.53 | 3.82 | 3.80 | 3.76 |
| 500 | 4.23 | 4.60 | 4.58 | 4.17 | 3.98 | 4.34 | 4.48 | 4.38 |
| 1000 | 4.58 | 5.42 | 4.90 | 4.56 | 4.27 | 4.61 | 4.97 | 4.84 |
| 2000 | 5.29 | 6.40 | 5.83 | 5.14 | 4.70 | 4.87 | 6.1 | 5.79 |

It is found that all the amines tested indeed neutralize the aqueous phase despite the continuous sparging of $CO_2$ and that they have a buffering effect. The rate of corrosion of the steel placed in the reactor (cell No. 1) as a function of the doses of amines tested is given in Table 2.

TABLE 2

Percentage of protection of the steel placed in the corrosive fluid of the reactor

| Dose (ppm) | IPOPA | DMAPA | MDEA | OA | EDIPA | pyridine | MOPA | CHA |
|---|---|---|---|---|---|---|---|---|
| 50 | 0 | 4% | 54% | 16% | 0 | 0 | 0 | 0 |
| 200 | 0 | 6% | 59% | 22% | 5% | 0 | 3% | 0 |
| 500 | 4% | 36% | 74% | 42% | 9% | 3% | 9% | 2% |
| 1000 | 16% | 60% | 81% | 52% | 21% | 5% | 25% | 17% |
| 2000 | 45% | 81% | 92% | 74% | 35% | 12% | 60% | 51% |

MDEA clearly protects the steel in the corrosive fluid of the reactor.

The neutralizing powers of the amines in the acidic condensate are shown in Table 3.

TABLE 3

Change in the condensate pH

| Dose (ppm) | IPOPA | DMAPA | MDEA | OA | EDIPA | pyridine | MOPA | CHA |
|---|---|---|---|---|---|---|---|---|
| 0 | 3.16 | 3.24 | 3.26 | 3.18 | 3.26 | 3.16 | 3.23 | 3.16 |
| 50 | 3.16 | 3.24 | 3.26 | 3.24 | 3.27 | 3.19 | 3.24 | 3.17 |
| 200 | 3.16 | 3.24 | 3.26 | 3.18 | 3.30 | 3.29 | 3.37 | 3.17 |
| 500 | 3.16 | 3.24 | 3.28 | 3.20 | 3.95 | 3.89 | 3.40 | 3.18 |
| 1000 | 3.16 | 3.24 | 3.28 | 3.22 | 4.40 | 4.29 | 3.42 | 3.18 |
| 2000 | 3.16 | 3.26 | 3.27 | 3.20 | 5.02 | 4.85 | 3.48 | 3.18 |

It is found that only the three amines according to the invention pass into the vapour phase and effectively neutralize the acidity of the condensate.

EXAMPLE 2

Evaluation of the Neutralizing Power of the 3 Amines According to the Invention

The neutralizing power of MDEA and of the 3 amines according to the invention is tested in an experimental device similar to that of Example 1. The distilled water, to which acetic acid is added, with or without neutralizing amines, is found in cell No. 1 (reactor). The temperature of this reactor is 95° C. Cell No. 2 is intended to recover the condensed phase (condensate) originating from cell No. 1. It is thus possible to directly measure the pH of the condensed water as a function of the content of amine added to the reactor. This cell is also equipped with a system which makes it possible to measure the rate of corrosion, by measurement of impedance, of the steel in contact with the condensate. The temperature in cell No. 2 is 60° C. The rate of condensation is controlled by the rate of sparging of $CO_2$. The details of this device are described in <<*Control of Top of Line Corrosion by Chemical Treatment*>>, *NACE Corrosion*/2001, *Paper No.* 01033, cited above. It is set at 0.7 ml/s.m$^2$, a fairly high value, in order to maintain the pH of the condensed water at a low value.

The pH for neutralization of the reactor, comprising 1043 ppm of acetic acid, and of the condensate as a function of the MDEA content is given in Table 4.

TABLE 4

| MDEA content | 0 ppm | 856 ppm | 1843 ppm |
|---|---|---|---|
| pH of the reactor comprising 1043 ppm of acetic acid | 4.10 | 5.00 | 7.00 |
| pH of the condensate | 4.10 | 3.90 | 4.10 |

The MDEA clearly neutralizes the neutralization of the aqueous phase present in the reactor. However, this amine has no influence on the pH of the condensate. These results confirm those of Table 1, where the experiments were carried out at a low rate of condensation.

The pH values for neutralization of the reactor and of the condensate for pyridine are shown in Table 5.

TABLE 5

| Dose of neutralizing agent | pH of the water in the reactor | pH of the condensate |
|---|---|---|
| 0 (without acetic acid) | 4.35 | 4.55 |
| 0 (with 500 ppm of acetic acid added to the reactor) | 3.70 | 3.60 |
| 100 | 4.10 | 3.80 |
| 200 | 4.12 | 3.70 |
| 400 | 4.30 | 3.95 |
| 600 | 4.45 | 4.30 |
| 800 | 4.6 | 4.60 |
| 1000 | 4.8 | 4.80 |

After saturation with $CO_2$, the pH of the reactor is 4.35 and that of the condensate is 4.55. The addition of 500 ppm of acetic acid to the reactor causes the pH of the reactor to fall to 3.7 and that of the condensate to fall to 3.6. The pH of the water in the reactor and of that of the condensate increase with the concentration of the pyridine up to 1000 ppm.

The pH values for neutralization of the reactor and of the condensate for MOPA are shown in Table 6.

TABLE 6

| Dose of neutralizing agent | pH of the water in the reactor | pH of the condensate |
|---|---|---|
| 0 (without acetic acid) | 4.30 | 4.10 |
| 0 (with 500 ppm of acetic acid added to the reactor) | 3.60 | 3.60 |
| 100 | 4.00 | 4.00 |
| 200 | 4.30 | 4.30 |
| 400 | 4.60 | 4.60 |
| 600 | 5 | 4.80 |
| 800 | 5.50 | 4.80 |
| 1000 | 6.10 | 4.80 |

After saturation with $CO_2$, the pH of the water in the reactor is 4.3 and that of the condensate is 4.1. The addition of 500 ppm of acetic acid to the reactor causes the pH of the reactor to fall to 3.6 and that of the condensate to fall to 3.6 also.

The pH of the condensate reaches saturation from 800 to 1000 ppm of MOPA. On the other hand, that of the reactor continues to increase.

The pH values for neutralization of the reactor and of the condensate for EDIPA are shown in Table 7.

TABLE 7

| Dose of neutralizing agent | pH of the water in the reactor | pH of the condensate |
|---|---|---|
| 0 (without acetic acid) | 4.35 | 4.55 |
| 0 (with 500 ppm of acetic acid added to the reactor) | 3.55 | 3.60 |
| 100 | 3.80 | 3.70 |
| 200 | 3.90 | 3.90 |
| 400 | 4.20 | 4.30 |
| 600 | 4.30 | 4.45 |
| 800 | 4.60 | 4.80 |
| 1000 | 4.80 | 4.45 |

After saturation with $CO_2$, the pH of the reactor is 4.35 and that of the condensate is 4.55. The addition of 500 ppm of acetic acid to the reactor causes the pH of the reactor to fall to 3.55 and that of the condensate to fall to 3.6.

EDIPA has the same behaviour as pyridine: the two pH values no longer increase from 800 ppm to 1000 ppm.

In contrast to Example 1, where the rate of condensation is very low, in Example 2, with a rate of condensation of water of 0.7 ml/s.m$^2$, it is found that MOPA has a greater neutralizing power than pyridine and than EDIPA.

EXAMPLE 3-A ph Measurement of the Reactor and of the Condensate as a Function of the Concentration of MOPA The experimental device used is described in Example 2.

Figure 3:
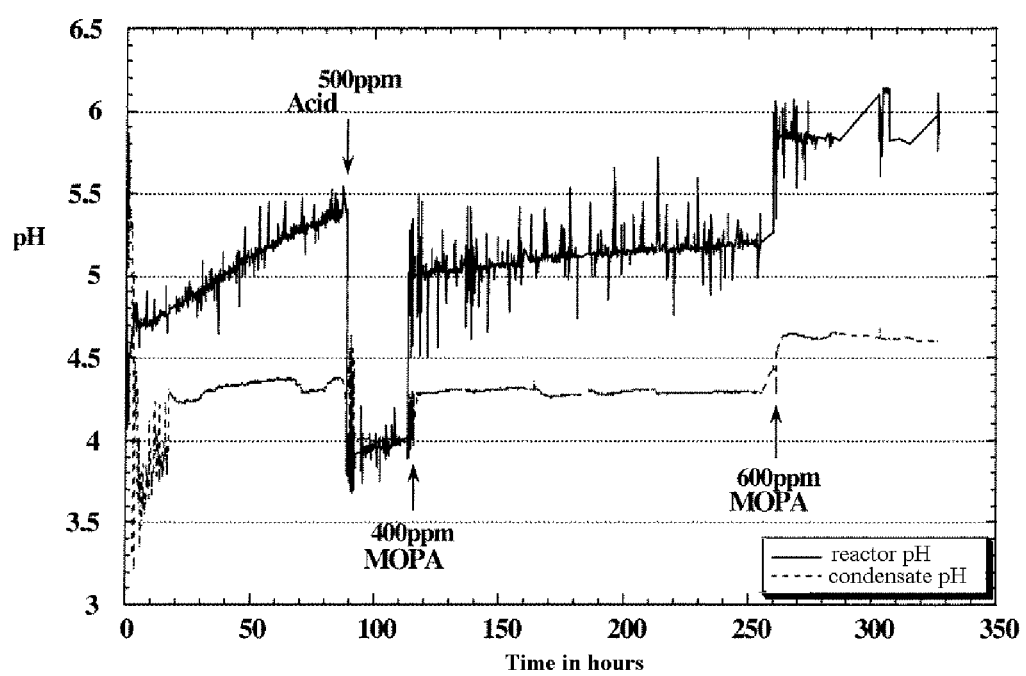
FIG. 3 is a graph showing PH and condensate overtime in a reactor.

The curves for change in pH of the reactor (upper curve) and that of the condensate (lower curve) are given in FIG. 3. The flow rate of the condensate is 0.7 ml/s.m.

In the medium saturated with $CO_2$, the pH of the water of the reactor stabilizes around 5.4 and that of the condensate stabilizes around 4.3. The addition of 500 ppm of acetic acid causes these two pH values to fall to 4.

At 400 ppm of MOPA added, the pH of the condensate stabilizes around 4.3 and that of the reactor stabilizes around 5.3.

At 600 ppm of MOPA added, the pH of the condensate stabilizes at 4.7 and that of the reactor stabilizes at 5.8.

MOPA clearly neutralizes the pH of the aqueous phase of the bottom line (reactor) and that of the condensed aqueous phase (condensate) of the roof.

EXAMPLE 3-B

Measurement of the Rate of Corrosion in the Condensate as a Function of the MOPA Concentration The values for rates of corrosion of a mild steel test specimen in contact with the condensate are given in Table 8 for various concentrations of acetic acid and of MOPA.

TABLE 8

| Condensation water | Polarization resistance ($\Omega \cdot cm^2$) | Rate of corrosion (mm/year) |
|---|---|---|
| I = saturated with $CO_2$ | 1640 | 0.20 |
| II = saturated with $CO_2$ + 500 ppm of acetic acid | 600 | 0.53 |
| II + 400 ppm | 1080 | 0.29 |
| II + 600 ppm | 1400 | 0.22 |

In the condensate saturated with $CO_2$, the rate of corrosion of the mild steel is 0.20 mm/year. The addition of 500 ppm of acetic acid causes this rate to increase to 0.53 mm/year.

In the presence of 400 ppm of MOPA, it is found that the rate of corrosion fell to 0.29 mm/year. At 600 ppm of MOPA, the rate of corrosion of the mild steel is 0.22 mm/year, close to 0.20 mm/year without acetic acid.

MOPA neutralizes the acidity of the acetic acid in the condensate and also protects from corrosion in this medium.

EXAMPLE 3-C

Influence of the Amount of Acetic Acid Added to the Reactor

The pH values of the condensation water in the presence of 1000 ppm of acetic acid added to the reactor, in the presence of MOPA or of MDEA, are given in Table 9.

TABLE 9

| | $CO_2$ added | 1000 ppm of acetic acid added | 400 ppm of neutralizing agent added | | 600 ppm of neutralizing agent added | | 800 ppm of neutralizing agent added | |
|---|---|---|---|---|---|---|---|---|
| | | | MOPA | MDEA | MOPA | MDEA | MOPA | MDEA |
| pH | 4.2 | 3.6 | 3.7 | 3.7 | 3.7 | 3.7 | 3.7 | 3.7 |
| Polarization resistance ($\Omega \cdot cm^2$) | 1640 | 600-400 | 900 | 400 | 1100 | 500 | 1300 | 500 |
| Rate of corrosion (mm/year) | 0.2 | 0.53-0.82 | 0.36 | 0.82 | 0.29 | 0.65 | 0.25 | 0.65 |

It is found that, as regards the pH, MOPA behaves like MDEA.

When the dose of MDEA is increased, the polarization resistance value remains approximately constant. Surprisingly, it is seen that, when the concentration of MOPA increases, the polarization resistance value also increases. The rate of corrosion decreases.

MOPA can thus pass into the vapour phase to inhibit corrosion in the condensation water.

EXAMPLE 4

Formulation of a Corrosion Inhibitor which Makes it Possible to Protect from to of Line Corrosion and Also Bottom Line Corrosion A corrosion-inhibiting formulation with the following composition was prepared, which formulation is subsequently referred to as Formula F:

| Amine according to the invention | 96% |
| --- | --- |
| Imidazoline | 1% |
| Ethoxylated imidazoline | 2.5% |
| Thioacid | 0.5% |

The amine according to the invention is MOPA.

The imidazoline is a condensation product between an oleic fatty acid and a polyalkylenepolyamine of DETA (Di-EthyleneTriAmine) type.

The ethoxylated imidazoline is the abovementioned imidazoline, the number of oxyethylene or OE units of which is 12.

The thioacid is thioglycolic acid.

MOPA is also tested alone.

EXAMPLE 4-A

Measurement of the pH of the Condensed Water and of the Polarization Resistance of Carbon Steel Placed in this Water as a Function of the Concentration of Formula F The values of the pH of the condensed water and of the polarization resistance as a function of the concentration of MOPA and of formula F are shown in Table 10. The study is carried out in the presence of 1000 ppm of acetic acid.

TABLE 10

| | 1000 ppm of acetic acid | | 400 ppm of neutralizing agent added | | 600 ppm of neutralizing agent added | | 800 ppm of neutralizing agent added | |
| --- | --- | --- | --- | --- | --- | --- | --- | --- |
| | $CO_2$ | added | MOPA | Formula F | MOPA | Formula F | MOPA | Formula F |
| pH | 4.2 | 3.6 | 3.7 | 3.7 | 3.7 | 3.7 | 3.7 | 3.7 |
| Polarization resistance ($\Omega \cdot cm^2$) | 1640 | 600 | 900 | 1200 | 1100 | 1400 | 1300 | 1900 |
| Rate of corrosion (mm/year) | 0.2 | 0.53 | 0.36 | 0.27 | 0.29 | 0.23 | 0.25 | 0.17 |

Up to 800 ppm, it is found that Formula F does not neutralize the acidity of the condensed water. Its pH remains constant. On the other hand, as for MOPA, the polarization resistance value increases with the concentration of F. The rate of corrosion decreases with the increase in the concentration of MOPA and of F. The increase in the polarization resistance or the decrease in the rate of corrosion is greater for Formula F than for MOPA alone.

EXAMPLE 4-B

Figure 4:
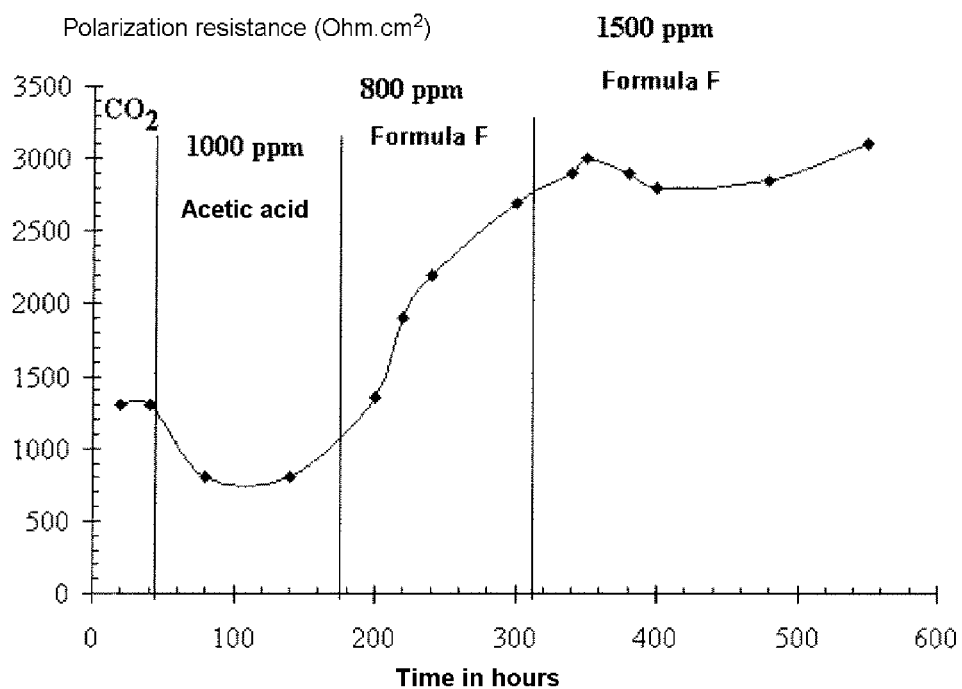
FIG. 4 is a graph showing polarization resistance of carton steel as a function of concentrations various materials.

Effectiveness in Combating Corrosion by the Bottom Line of Formula F in a Medium Saturated with $CO_2$ Comprising 1000 ppm of Acetic Acid Under Static Conditions The variation in the polarization resistance of a carbon steel in demineralized water saturated with $CO_2$ placed in the reactor at 60° C. as a function of the concentration of Formula F is shown in FIG. 4. This experiment represents the study of inhibition of the bottom line. It may be observed that the polarization resistance value in the presence of 1000 ppm of acetic acid is $800\Omega \cdot cm^2$ (i.e., a rate of corrosion of 0.41 mm/year). From 800 ppm of Formula F, the polarization resistance stabilizes around $3000\Omega \cdot cm^2$ (i.e., a rate of corrosion of 0.10 mm/year). Formula F also protects from bottom line corrosion.

EXAMPLE 4-C

Figure 5:
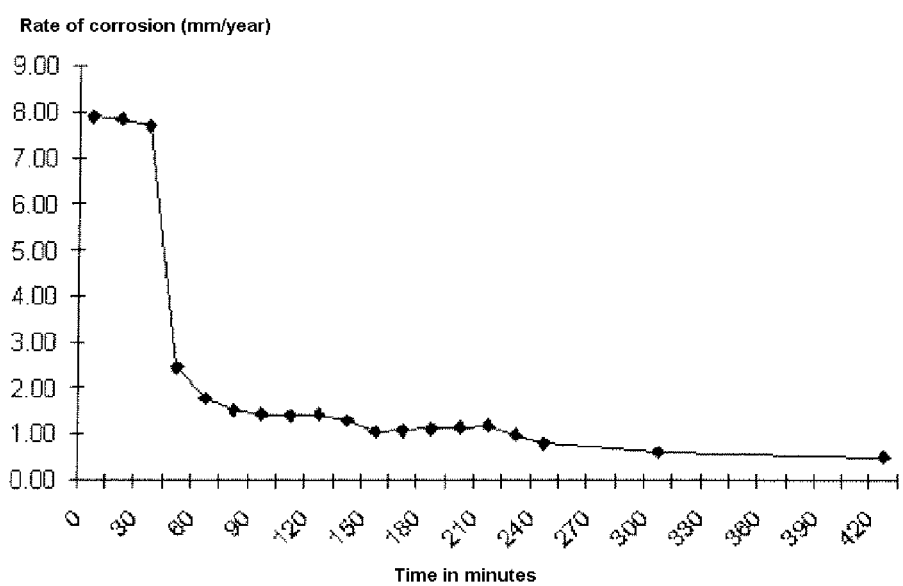
FIG. 5 is a graph showing corrosion as a function of time.

Effectiveness in Combating Corrosion by the Bottom Line of Formula F in a Medium Saturated with $CO_2$ comprising 1000 ppm of Acetic Acid Under Dynamic Conditions The variation in the rate of corrosion of the carbon steel electrode in water comprising 1 g/l of NaCl saturated with $CO_2$ with 1000 ppm of acetic acid at 60° C. and under the shear stress of 70 Pa as a function of time is given in FIG. 5.

The dosage of Formula F is 1000 ppm. It is seen, in this curve, that the initial rate of corrosion is 7.8 mm/year. After the addition of Formula F, this rate falls and stabilizes at 0.7 mm/year, i.e. more than 90% protection.

The invention claimed is:

1. A process for limiting top of line corrosion of oil pipes, in which a petroleum fluid circulates and which pipes are employed in the production of oil or gas, said process comprising limiting said top of line corrosion in an oil pipe having stratified flow, by injecting an inhibitory composition comprising, as corrosion inhibitor, at least one pure or diluted amine with a boiling point of between 105 and 130° C. or least one amine which is:

3-methoxypropylamine (MOPA),
into the petroleum fluid present and/or circulating in the pipe.

2. The process for limiting top of line corrosion of oil pipes and other types of corrosion as to claim 1, wherein the inhibitory composition further comprises at least one corrosion-inhibiting molecule that is an imidazoline or phosphoric ester and/or thioacid.

3. The process according to claim 2, wherein the inhibitory composition, used pure or diluted, comprises:
   50 to 97 parts by weight of MOPA, 1 to 10 parts by weight of at least one imidazoline,
   1 to 20 parts by weight of at least one ethoxylated imidazoline,
   1 to 20 parts by weight of at least one thioacid.

4. A process according to claim 1, wherein the inhibitory composition is soluble in all proportions in water and does not promote the formation of oil/water emulsion or the formation of foam.

5. The process according to claim 1, wherein the inhibitory formulation protects the pipe from both top of line corrosion and from bottom line corrosion.

6. The process according to claim 1, wherein the inhibitory composition is injected continuously in a proportion of 100 ppm to 10 000 ppm, expressed as weight of the corrosion-inhibiting materials, per one part by volume of petroleum fluids to be treated.

7. A process according to claim 1, wherein said injecting is continuous.

* * * * *